United States Patent [19]

Beglin et al.

[11] Patent Number: 5,325,523
[45] Date of Patent: Jun. 28, 1994

[54] METHOD FOR DELETING OBJECTS FROM LIBRARY RESIDENT OPTICAL DISKS BY ACCUMULATING PENDING DELETE REQUESTS

[75] Inventors: Thomas W. Beglin; Kimberly M. Zelazny, both of Tucson, Ariz.

[73] Assignee: International Business Machines Corporation, Armonk, N.Y.

[21] Appl. No.: 683,768

[22] Filed: Apr. 10, 1991

[51] Int. Cl.$^5$ ............................................. G06F 12/00
[52] U.S. Cl. ............................. 395/600; 395/425; 395/650; 395/725; 364/DIG. 2; 364/243; 364/233.1
[58] Field of Search ................. 364/200; 395/700, 145, 395/600, 425, 650, 725

[56] References Cited

U.S. PATENT DOCUMENTS

| | | | |
|---|---|---|---|
| 3,449,724 | 6/1969 | Boland et al. | 364/200 |
| 4,271,489 | 6/1981 | Siryj et al. | 369/38 |
| 4,527,262 | 7/1985 | Manto | 369/33 |
| 4,614,474 | 9/1986 | Suda | 414/281 |
| 4,876,662 | 10/1989 | Pence | 364/900 |
| 4,974,197 | 11/1990 | Blounte et al. | 364/900 |
| 4,996,663 | 2/1991 | Nemes | 364/900 |
| 5,161,214 | 11/1992 | Addink et al. | 395/145 |
| 5,193,184 | 3/1993 | Belsan et al. | 395/600 |

OTHER PUBLICATIONS

Patent Appln. Ser. No. 07/317,493, Gallo et al., Filed Mar. 1, 1989, Assigned to IBM.

Primary Examiner—Thomas C. Lee
Assistant Examiner—Michael A. Oblon
Attorney, Agent, or Firm—C. B. Lobsenz; M. W. Schecter

[57] ABSTRACT

The response time of an automated optical disk library is improved by writing object delete requests to a deleted objects table before actually physically deleting those objects. By collecting object delete requests in a list of pending deletes for each volume in the library the number of necessary mounts are reduced. The delete requests in a list of pending deletes for a given volume are physically deleted just prior to performing a write or defrag request for that volume. The list of pending deletes for that volume are then deleted from the deleted objects table. During idle periods a predetermined number of pending delete requests will be performed for the currently mounted volume. If there are no pending delete requests for the currently mounted volume then a predetermined number of pending delete requests will be performed on the opposite side of the currently mounted volume. When all pending delete requests for both the currently mounted volume and the opposite side thereof have been completed the library-resident volume having the greatest amount of space to be deleted will be mounted and a predetermined number of pending deletes will be performed on that volume. This process continues as long as there are pending deletes. If all of the objects on an optical disk have expired then the next time that disk is mounted it will be reformatted.

8 Claims, 5 Drawing Sheets

METHOD FOR DELETING OBJECTS FROM LIBRARY RESIDENT OPTICAL DISKS BY ACCUMULATING PENDING DELETE REQUESTS

FIELD OF THE INVENTION

This invention relates generally to the field of automated storage libraries and more particularly, to a method of reducing the number of required mounts when deleting objects from optical disks in an automated optical disk library.

BACKGROUND OF THE INVENTION

Mini and mainframe computers are required to process, and hence store, large amounts of information. Fast processing of information requires that the central processing unit of these computers be able to transfer that information at a high rate of speed. The storage medium used to store information will typically be the limiting factor of the transfer rates.

The fastest storage medium in a computer is main memory which is often referred to as cache memory. This is usually in the form of semiconductor dynamic random access memory (DRAM). While main memory is very fast it is also very expensive relative to other forms of storage media and the amount of main memory that can be economically provided falls far short of the overall storage requirements. Main memory use is thus limited to short term storage of currently active information. The remaining information storage requirements are typically handled by peripheral storage devices.

Peripheral storage devices include magnetic tape storage devices, Direct Access Storage Devices (DASD), and optical storage devices. Each of these storage devices has a substantially greater storage density and lower cost than main memory. However, the time to access information from each of these storage devices is also much greater than the access time of information from main memory. For example, main memory is accessed electronically and no mechanical movement is required. Peripheral storage devices, on the other hand, require that a particular area of a tape or disk first be positioned under a read/write head before information accessing can begin.

Some applications must store and retrieve such large amounts of information that many storage devices are required. In these applications the user typically requires a hierarchy of storage that includes some combination of main memory and one or more types of peripheral storage devices. The goal of the hierarchy is to obtain moderately priced high capacity storage while maintaining high speed access to the stored information. Hierarchical storage typically allows information to be transferred between main memory and one or more of the peripheral storage devices or between one or more peripheral storage device and one or more other peripheral storage devices. Further storage is provided by maintaining libraries of data storage media such as tapes, magnetic disks or optical disks that can be mounted onto the existing peripheral devices. However, additional delays of accessing the information is introduced due to the necessity of having to manually locate and then load, for example, an optical disk onto an optical drive.

Automated storage libraries improve the access time to information stored on a tape, magnetic disk, or optical disk contained therein by automatically managing the storage of such tapes and disks. Automated storage libraries include a plurality of storage cells for storing library-resident data storage media, a robotic picker mechanism, and one or more internal peripheral storage devices. Each data storage medium may be contained in a cassette or cartridge housing for easier handling by the picker. The picker operates on command to transfer a data storage medium between a storage cell and an internal peripheral storage device within seconds. A significant improvement in access time to the desired information is provided since the picker mechanism operates much faster to transfer a storage medium than does a manual operation. Still more storage may be provided by including an external shelf for storing additional data storage media which may be manually inserted into the automated storage library.

The improved response time provided by automated storage libraries has made it feasible to store a large number of images as a data type for computer processing. Such images include engineering drawings, financial and insurance documents, medical charts and records, voice data, etc. These images are known as objects in order to identify them as data elements having an unconventional data structure. Text, a conventional data structure, is encoded on a storage medium in streams of binary 1's and 0's of fixed lengths. An object, on the other hand, is a named stream of binary 1's and 0's of a known length. The length of the stream of bits is not fixed but may vary from a few bytes to several megabytes.

Optical disks provide the highest density of the disk storage media and hence an automated optical disk library is most suitable for storing large object databases. Examples of optical disk libraries are given in U.S. Pat. Nos. 4,271,489, 4,527,262 and 4,614,474. Each optical disk in an optical disk library consists of two logical volumes so that there is one volume per side. To access objects on a given volume, that volume is retrieved from the library by the picker and mounted onto an internal optical drive. This may require that a presently mounted volume first be demounted and stored in the library by the picker.

Hundreds of millions of objects can be stored in an automated optical disk library. Efficient management is a necessity given the large number of objects handled. Management is provided by object management software. An example of such object management software is Object Access Method software (OAM). OAM is a subcomponent of an IBM program product, Multiple Virtual Storage/Data Facility Product software (MVS/DFP), which manages the hundreds of millions of objects. OAM keeps an inventory of each object including its location information in an OAM object directory. Library Control System software (LCS) is a subcomponent of OAM for processing a variety of requests affecting the optical disks. Processing the requests requires that the corresponding volume be mounted on an optical drive. If that volume is library-resident the picker automatically moves the optical disk cartridge from the storage area to an optical drive. If the volume is shelf-resident, then mounting is accomplished with human intervention. In cases of shelf-resident volumes, LCS issues a message to an operator regarding the shelf location and the optical drive designated to receive the volume.

LCS performs volume requests which are those requests that affect a volume as a whole. Volume requests include the requests for auditing or defragmenting a volume. A volume is audited by retrieving and mounting that volume for the purpose of verifying that the optical disk cartridge containing the volume is actually present within the library. Defragmenting a volume entails moving data recorded on a volume in order to reduce the number of free extents thereby increasing the size of the free extents. Each free extent consists of one or more adjacent sectors wherein no two free extents are contiguous. Increasing the size of the free extents increases the probability that a file will be able to occupy a single contiguous area. This in turn reduces the time required to read such a file since seek operations to different physical areas of the surface of the volume are not required when sequentially reading a file. Normally there will be relatively few volume requests pending for a given volume.

LCS also performs object requests which are requests to perform an operation on an object. Object requests include requests to read, write, or delete an object from a volume. Write requests further include specific and nonspecific write requests. A specific write request identifies a specific volume to be written to. A nonspecific write request only identifies a storage group from which a volume may be chosen according to a LCS volume selection algorithm. A storage group is a collection of optical disk volumes having some specified attributes in common. Volume selection is determined by choosing the volume having the least amount of available space yet capable of accommodating the object to be written. Deleting an object may be accomplished by simply mounting the volume containing the object to be deleted and deleting the object. Similarly, a read request is serviced by mounting the correct volume and reading the object therefrom. There can be a large number of object requests pending for any one given volume.

Due to the large number of requests that may be queued up in an automated library it is necessary to manage the queued requests efficiently. The manner in which the queued requests are executed has a significant impact on the efficiency of information access. Efficiency can be improved by prioritizing requests according to predetermined attributes, for example, according to the information presently stored in main memory, on a first-in first-out basis, or according to the volumes already mounted in the peripheral devices. These prioritization techniques are described in commonly assigned patent application Ser. No. 07/317,493 filed Mar. 1, 1989. Blount, et al., in U.S. Pat. No. 4,974,197 describe a method of improving the efficiency of writing a Volume Table of Contents (VTOC) and the associated objects to an optical disk by collecting a given number of predetermined objects such that a single access writes the objects and the corresponding VTOC entry.

Mounting a volume, even if done by the robotic picker, is very slow relative to the seek time of an object plus the writing, reading or deleting time of even large objects. Performing many mounts, therefore, substantially slows the servicing of the pending requests. The efficiency of an automated library could be improved by reducing the number of mounts for a given number of volume and object requests.

Thus, what is needed is an automated optical disk library that provides a method of reducing the number of required mounts when deleting objects from optical disks contained therein.

SUMMARY OF THE INVENTION

Accordingly, it is an object of the present invention to provide an improved method of deleting objects from volumes in an automated storage library.

Another object of the present invention is to provide an improved method of reclaiming space on a disk.

Yet another object of the present invention is to provide an improved method of writing and defragmenting objects on adisk in an automated storage library.

Still another object of the present invention is to provide a method of reducing the number of mounts necessary to service a given number of requests in an automated library.

These and other objects of this invention are accomplished in an information processing system having a method of deleting objects from given volumes. This method includes receiving delete requests and writing those delete requests to a deleted objects table such that each delete request is added to a list of pending deletes for the appropriate volume. The space associated with each delete request is then logically deleted on the appropriate volume to allow a non-specific write request to select the volume having the least amount of free space yet enough free space to store the object to be written. When a write request is received the selected volume is mounted if it is not already mounted in a drive. Before writing the object to the mounted volume all of the pending deletes for that volume are executed. By executing the pending deletes, the logically deleted space for that volume is physically deleted. The logically deleted space of the volume is added to current free space of that volume and the write request is performed. The number of volume mounts are thus reduced by not mounting a volume every time a delete request is queued but by waiting until a write request is received for that volume.

The foregoing and other objects, features and advantages of the invention will be apparent from the following more particular description of the preferred embodiment of the invention, as illustrated in the accompanying drawing.

DESCRIPTION OF THE PREFERRED EMBODIMENT

Figure 1:
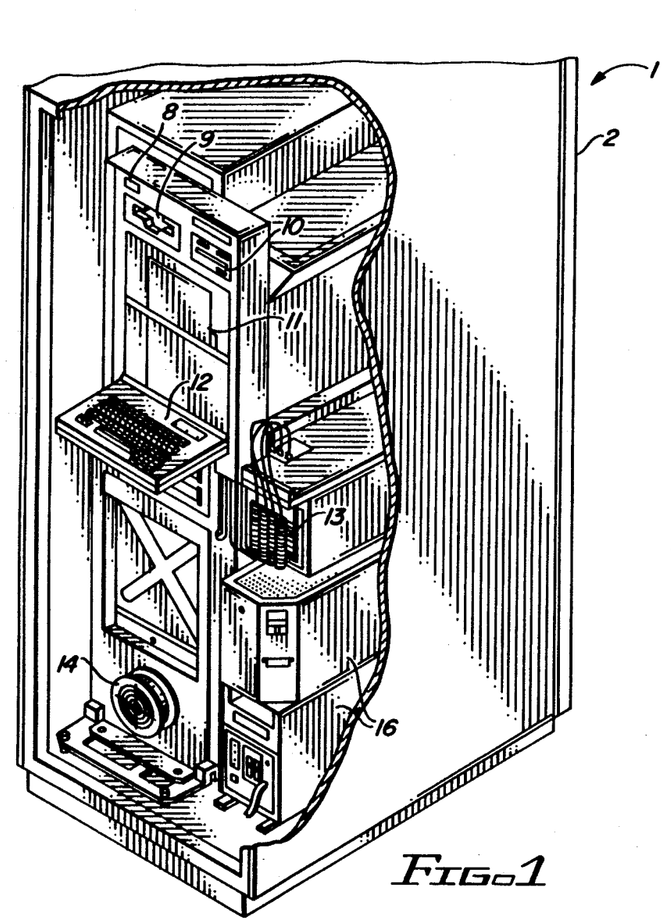
FIG. 1 is a front, perspective cut-away view of an automated optical disk library.
Figure 2:
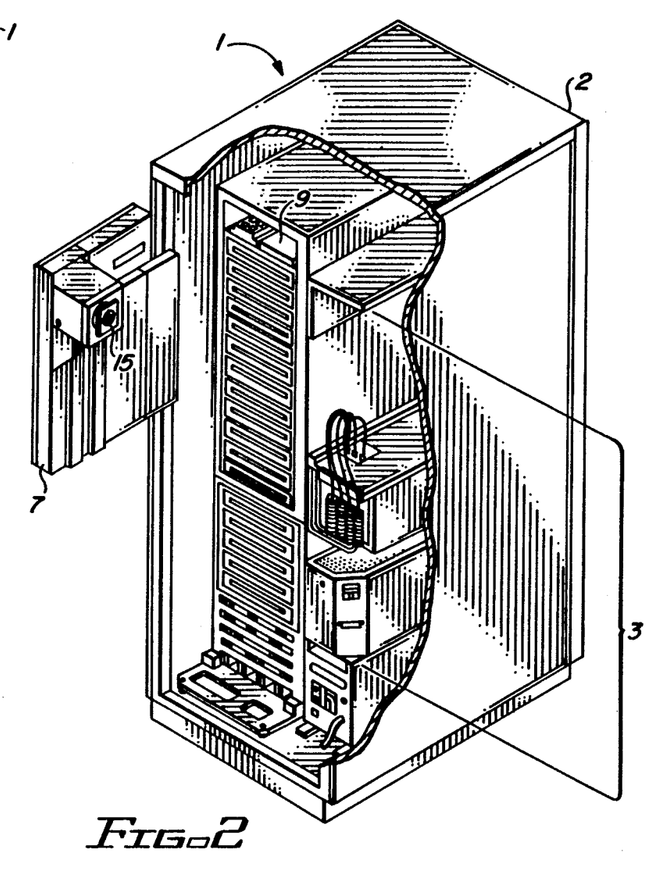
FIG. 2 is the same view as in FIG. 1 except that a console panel has been swung aside and a fan has been removed.
Figure 3:
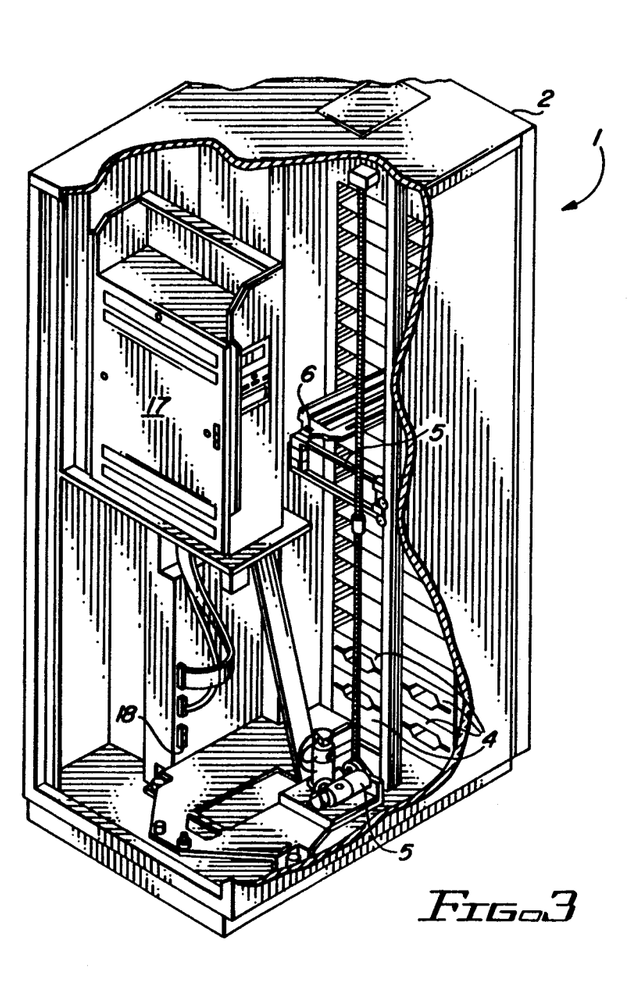
FIG. 3 is a rear perspective cut-away view of the automated optical disk library of FIGS. 1 and 2.

Referring now more particularly to the drawing, like numerals denote like features and structural elements in the various figures. Referring to FIGS. 1-3, various views of an automated optical disk library 1 are shown. The library 1 includes a housing 2 enclosing most of the working parts of the library 1 and having front and rear door panels (not shown) for interior access. Library 1 also includes a plurality of optical disk storage cells 3 and a plurality of internal optical disk drives 4. Each storage cell 3 is capable of storing one optical disk having data recorded on one or both sides thereof. The data stored on each side of a disk is referred to as a volume so that there are two volumes per disk. Automated optical disk library 1 includes 144 storage cells 3 arranged in two 72 storage cell columns and up to four internal optical disk drives 4.

A robotic picker 5 includes a single gripper 6 capable of accessing an optical disk in any of the storage cells 3 or optical disk drives 4 and transferring such optical disks therebetween. The optical disks are configured in cartridges for easy handling by the gripper 6 and are 5¼ inch form factor disks, but alternative embodiments could be any size compatible with the optical disk drives 4 and the gripper 6.

Although the front face of the housing 2 is not shown in FIG. 1, certain portions of the library 1 protrude through such front face of the housing 2 for operator access. These portions are part of a console door 7 and include all or part of a power indicator/switch 8, an entry/exit slot 9, an external optical disk drive 10, a console 11, and a keyboard 12. The console door 7 can be swung aside to allow access therebehind. The slot 9 is used for inserting optical disks into or removing optical disks from the library 1. Commands may be provided by an operator to the library 1, via the keyboard 12, to have the robotic picker 5 receive an optical disk inserted at the slot 9 and transport such optical disk to a storage cell 3 or optical disk drive 4 and deliver such optical disk to the slot 9 for removal from the library 1. Console 11 allows an operator to monitor and control certain operations of the library 1 without seeing inside the housing 2. External optical disk drive 10 cannot be accessed by the gripper 6 but must be loaded and unloaded manually. The library 1 also includes an optical disk drive exhaust fan 14, an external disk drive exhaust fan 15, and power supplies 16.

Once the library 1 is powered on, commands received from the keyboard 12 are forwarded to a system controller 17. In the preferred embodiment, the system controller 17 is an IBM PS/2 Model 80 personal computer using the OS/2 operating system. The system controller 17 includes main memory and one or more storage media, such as those in fixed or floppy disk drives. The system controller 17 issues instructions to the optical disk drives 4, the external optical disk drive 10, and the robotic picker 5. Drive controller card 13 and robotic picker controller card 18 convert known small computer system interface (SCSI) command packets issued by the system controller 17 into an electromechanical action of the optical disk drives 4, the external optical disk drive 10, and the robotic picker 5.

Figure 4:
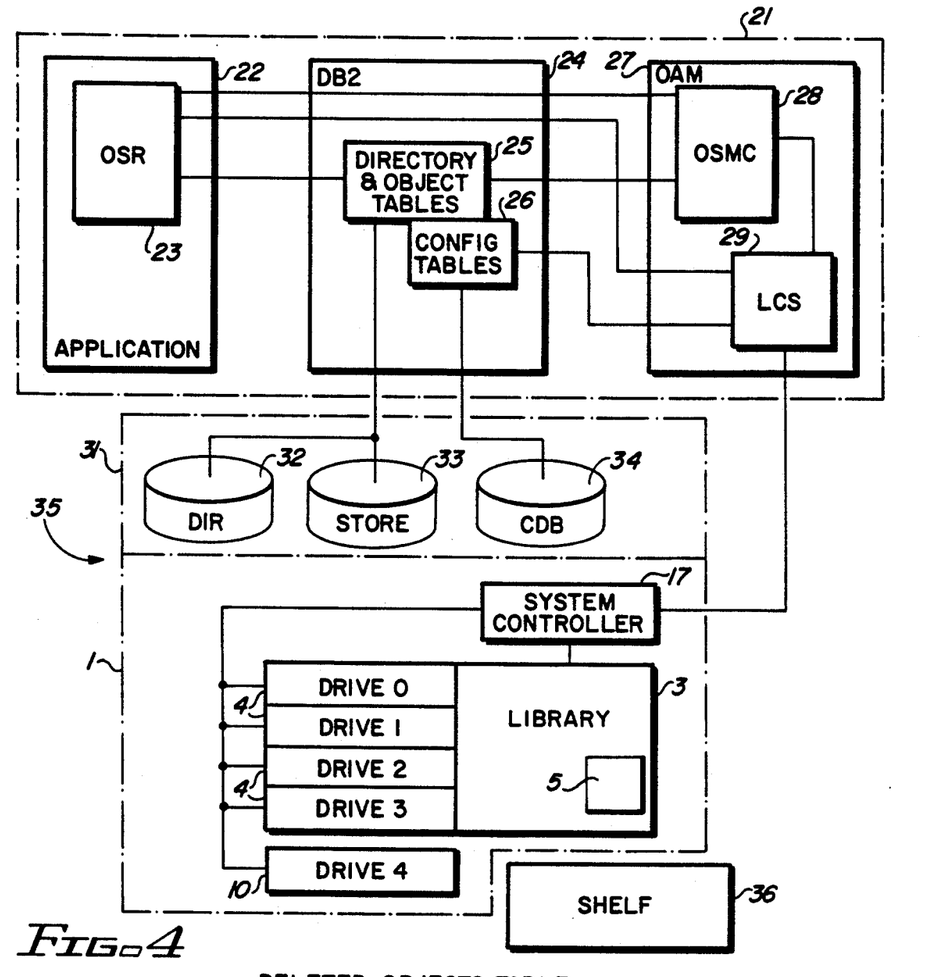
FIG. 4 is a block diagram of an object storage hierarchy utilizing Object Access Method software to manage objects in an automated optical disk library.

Referring now to FIG. 4, a block diagram of an object storage hierarchy 35 is shown which includes a management and first level storage 21, a second level storage 31 and the automated storage library 1 providing a third level of storage. A fourth level of storage is provided by a shelf 36. The shelf 36 stores optical disk volumes which are manually loaded into the the external optical disk drive 10 for reading, writing and deleting data therefrom. The management and first level storage 21 further includes an application interface 22, a relational database management system (DB2) 24 and an OAM 27. Application interface 22 is typically a workstation server which has the capability of sending and receiving scanned documents (objects) and interfacing to DB2 24 and OAM 27 via Object Storage and Retrieval software (OSR) 23.

OSR 23 provides an application program interface for storing, retrieving, and deleting individual objects. OSR 23 also maintains information about objects in DB2 24 including object name, size, location, creation date, last reference date, etc. DB2 24 and OAM 27 are stored on a mainframe computer (not shown) as part of MVS/DFP operating system wherein the mainframe computer includes main memory as the first level of storage in the object storage hierarchy 35. DB2 24 includes directory and object tables 25 and configuration tables 26 which are connected to OSR 23 for storing object information thereon.

OAM 27 includes OAM Storage Management Component (OSMC) 28 and Library Control System (LCS) 29. OSMC 28 is connected to the LCS 29, to the OSR 23, and to the directory and object tables 25. The function of the OSMC 28 is to manage an inventory of hundreds of millions of objects within an object storage hierarchy based on a specified storage management policy. OSMC 28 management includes determining where objects are to be stored, moving objects within an object storage hierarchy, managing object backup, and determining object expiration. LCS 29 is connected to the OSR 23, the configuration tables 26, and to the system controller 17 of the automated optical disk library 1. LCS 29 reads and writes objects to optical disks, manages volumes storing those objects, and interfaces with the system controller 17.

The second level storage 31 includes DASDs DIR 32, STORE 33, and Configuration Database (CDB) 34. The DIR 32 stores directory information of stored objects, the STORE 33 stores objects, and the CDB 34 stores several tables including a deleted objects table, a volume table, a library table, a slot table, and a drive table. CDB 34 is connected to the configuration tables 26, and DIR 32 and STORE 33 are connected to the directory and object tables 25. The third level of storage includes the automated optical disk library 1 having the system controller 17 connected to the storage cell 3 and the robotic picker 5, the optical disk drives 4 consisting of drives 0-3, and to the external optical disk drive 10. The fourth level of storage is provided by the shelf 36 which is interfaced to the automated optical disk library 1 by an operator transferring optical disks therebetween.

Figure 5A:
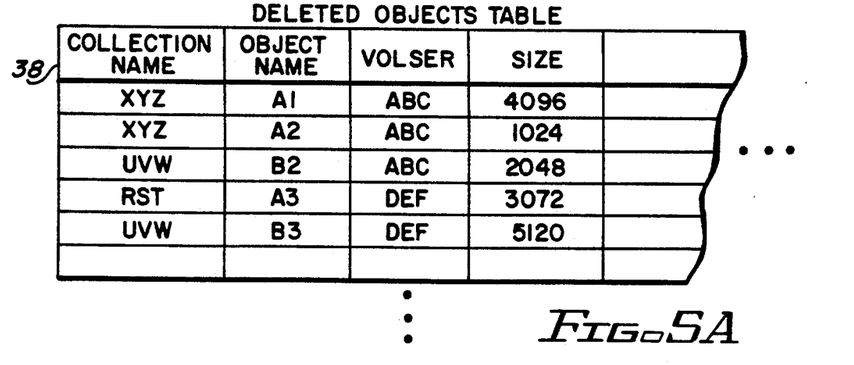
FIG. 5A is a table representation of a portion of a deleted objects table.
Figure 5B:
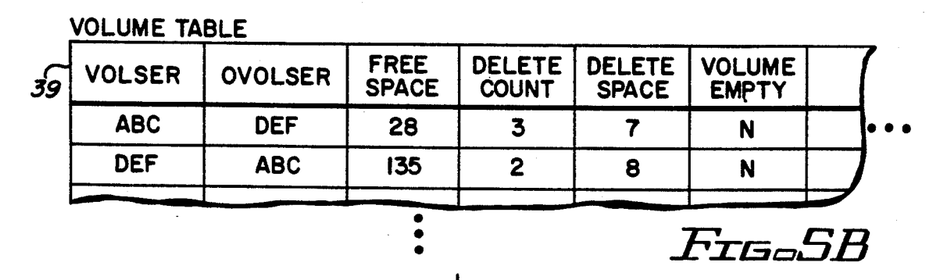
FIG. 5B is a table representation of a portion of a volume table.

FIGS. 5A and 5B show a portion of a deleted objects table 38 and a portion of a volume table 39, respectively, that are stored on the CDB 34. Each row of the deleted objects table 38 stores information about an object that is to be deleted. Each row of the deleted objects table 38 includes: the name of the collection that the object is stored in (collection name); the object name; the identification of the volume the object is stored on (VOLSER); and the size of the object in bytes. Each row in the volume table 39 stores information about a volume in the automated optical disk library 1 (and in the shelf 36). Stored volume information includes: the volume identification (VOLSER); the identification of the opposite side of the volume (OVOLSER); the amount of current free space in kilobytes (1 kilobyte equals 1024 bytes); the number of objects to be deleted (delete count); the amount of space used by the objects that are to be deleted in kilobytes (delete space); and whether the volume is empty or not (volume empty). In the volume table 39 the first two rows contain information about volume ABC and the opposite side DEF, respectively.

Figure 6:
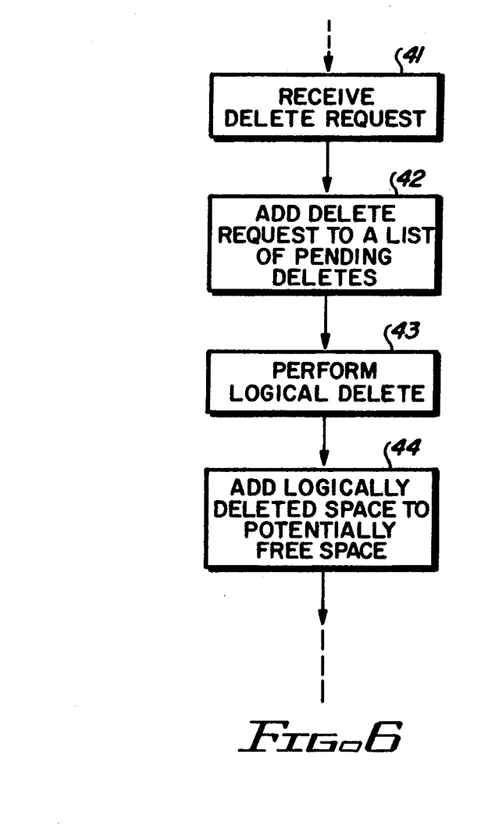
FIG. 6 is a flow diagram of a routine for managing delete requests in an automated optical disk library of the present invention.

Referring now to FIG. 6 a flow diagram of a routine for managing delete requests is shown. In step 41 delete requests are received in the LCS 29. The delete request can be user initiated, as generated in the application interface 22, or the delete request can be the result of an expired object, as generated in the OSMC 28. When the LCS 29 receives a delete request for an object residing on a re-writable optical disk volume, a row entry is made in the deleted objects table 38 as shown by step 42. The first row in the deleted objects table 38 shows that object A1 of the collection XYZ is stored on volume ABC and uses 4096 bytes of space. The space associated with the object to be deleted is logically deleted from the corresponding volume in step 43.

To perform the logical delete the size of the object to be deleted is added to the delete space for that volume and a delete count is incremented by one for that volume in the volume table 39. There are currently 3 pending deletes for the objects residing on volume ABC which are stored in the first three rows of the deleted objects table 38 and make up a list of pending deletes for volume ABC. The sum of the space of the pending deletes equals 7 kilobytes and is represented in the delete space of the volume table 39 for volume ABC by the 7 recorded therein. Assuming another delete request is received for an object requiring two kilobytes of space and residing on the volume ABC, then a row describing the object would be added to the deleted objects table, the delete space would be increased to 9, and the delete count would be increased to 4. Step 44 includes adding the logically deleted space to the potential free space of volume ABC. According to the last example, the last delete request caused the delete space to increase from 7 to 9 and the step 44 then causes the potential free space to be equal to the sum of the current free space, 28, plus the delete space, 9, for a total of 37 kilobytes. The potential free space is calculated and used in an LCS volume selection algorithm described below. Performing the physical delete of the objects depends upon the other requests that are pending for the volume and whether the volume is library or shelf-resident.

Figure 7:
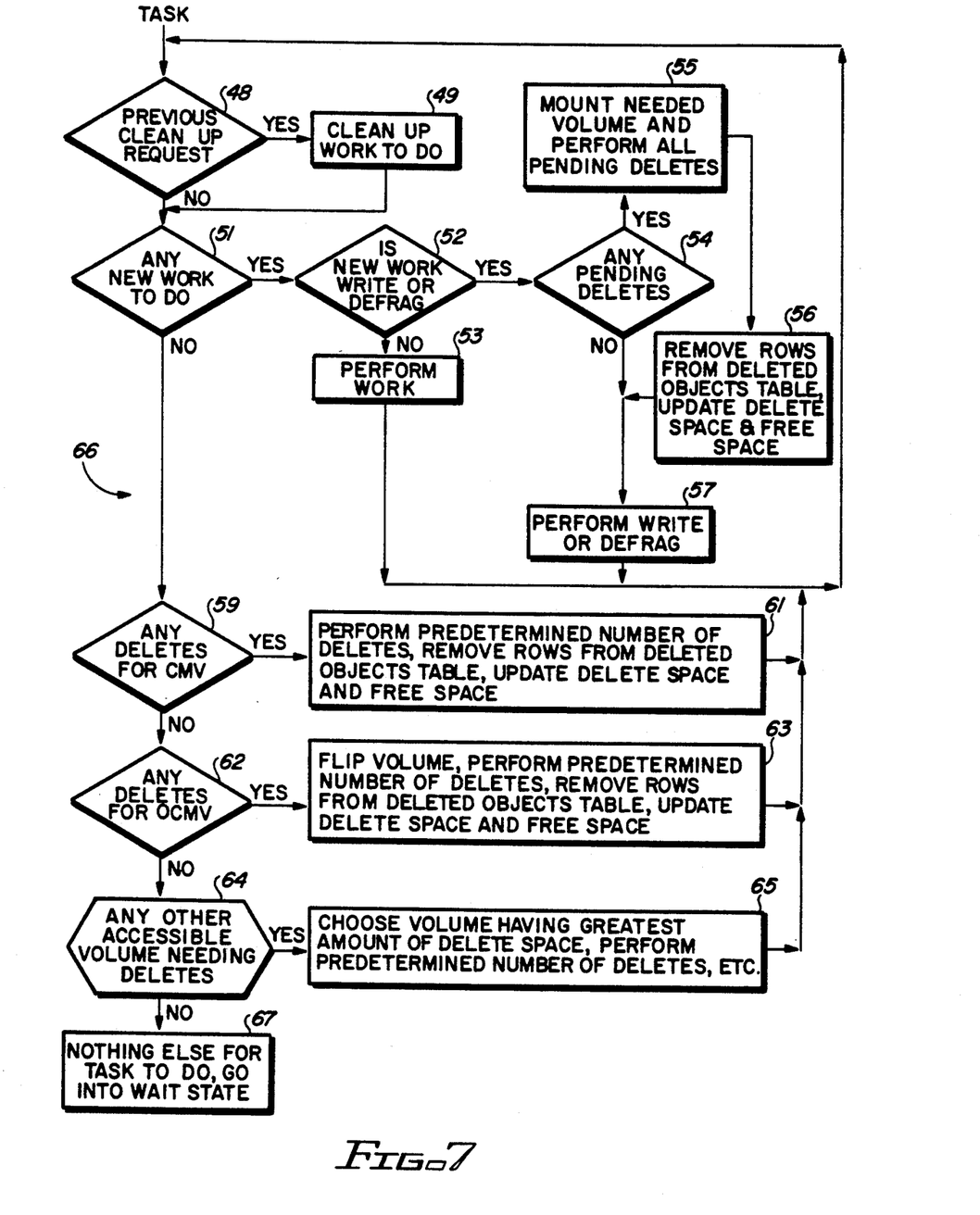
FIG. 7 is a flow diagram of a task which is part of a method of deleting objects in an automated optical disk library of the present invention.

FIG. 7 is a flow diagram representation of a task 66 for deleting objects from a volume in the automated optical disk library 1. A task 66 exists for each optical disk drive 4 and for the external optical disk drive 10 such that in the automated optical disk library 1 five tasks 66 could be running concurrently. A dispatcher (not shown) controls each task 66 by providing work thereto. The first step in the task 66 is to determine whether a request to cleanup is pending as shown in step 48. Cleanup requests result from previous work performed, for example a write request, wherein not all details of the work was completed. If a cleanup request is pending the associated work to be done is completed in step 49. Only after determining that no cleanup work needs to be done or after completing that cleanup work does the task 66, in step 51, check to see if there is any new pending work to be done.

When there is no new work pending, control is transferred to step 59 to determine whether there are pending deletes to be processed. However, if new work is pending, the task 66 determines what type of work is pending and, depending on the type of work pending, whether any deletes are also pending. Step 52 tests whether the new pending work is a write or defragmentation request. New pending work that is other than a write or defragmentation request is immediately performed in step 53 after which control is returned to the dispatcher. If a write or defragmentation request is pending for a given volume, control is transferred to step 54 for determining whether there are any pending deletes for that volume. In the case of no pending deletes for the given volume, that volume will be mounted and the write or defragmentation request is performed in step 57.

Should step 54 determine that deletes are pending, control will be transferred to step 55 where that volume will be mounted on the optical disk drive 4 or the external optical disk drive 10 for which the task 66 is running. All pending deletes for that volume will be performed prior to the write or defragmentation request regardless of whether the volume is library or shelf-resident. In the case of write requests, all pending deletes are done before the write request regardless of whether the write request is specific or nonspecific.

Assuming a write request is received for the volume ABC, in step 55 the volume ABC will be mounted if it is not already mounted so that volume ABC becomes a currently mounted volume (CMV). All pending deletes for the volume ABC are also performed by sending commands to the system controller 17 to physically delete each object and to reclaim space allocated to each deleted object. In step 56 the logically deleted space is added to the current free space for the volume ABC and is reflected in the volume table 39. The rows of pending deletes for the volume ABC in the deleted objects table 38 are also deleted. Thus, the first three rows of the deleted objects table 38 would be removed in step 56. In step 57 the write or defragmentation request is performed. After step 57 is performed control returns to the dispatcher.

The pending deletes are performed before the write command because the LCS volume selection algorithm considers the logically deleted space to be part of the potential free space of the volume. As described above, the LCS algorithm adds the logically deleted space to the current free space to determine the potential free space. The potential free space is used when determining which volume has the least amount of free space but can still accommodate the object to be written in a nonspecific write request. For specific write requests the potential free space is used to determine whether the requested volume can accommodate the object to be written. Similarly, performing all pending deletes prior to processing a defragmentation request reduces the time necessary to perform the defragmentation request by reducing the amount of data that must be moved in order to defragment the volume. Furthermore, the volume ABC has only been mounted once to perform all of the pending deletes and the write or defragmentation request.

Returning to step 51, if no new work is pending then control drops down to step 59 for determining, in the event of an idle period, whether there are any pending deletes for the CMV. An idle period exists when the task seeking work makes a complete pass through the dispatcher without receiving any work to do. Having no work for the task to do, the dispatcher tries to find deletes for the task to perform. In steps 59 through 65 pending deletes for library-resident volumes are performed during periods of library inactivity. When an optical disk drive 4 is available and no other requests are pending then pending deletes will be scheduled for the available optical disk drive. The pending deletes are performed in the following priority: pending deletes for the CMV; pending deletes for the opposite side of the currently mounted volume (OCMV); and pending deletes for the library-resident unmounted volume having the greatest amount of logically deleted space.

Assuming the volume ABC is the CMV, in step 59 a determination is made as to whether there are any pending deletes for the volume ABC. If there are pending deletes for the volume ABC then a predetermined number of the pending deletes will be performed in step 61 by sending a DELETE command to the system controller 17 which prompts the optical disk drive 4 having the volume ABC mounted thereon for removing the directory entries for the deleted objects and physically reclaiming the space allocated to each deleted object. For example, up to 10 objects may be deleted from the volume ABC in step 61. Limiting the number of pending deletes performed during an idle period prevents excessive delays of servicing other object or volume requests. After the predetermined number of pending deletes are performed the corresponding rows in the deleted objects table 38 are deleted by issuing a SQL DELETE command (Structured Query Language). The delete space and current free space are also updated by adding the space of the deleted objects to the free space in the volume table 39.

After updating the current free space for the CMV control returns to the dispatcher to again determine whether there is any pending work. If other pending work has been received then control goes back to steps 48–57. As long as there is no other pending work then steps 59 and 61 will be repeated until all pending deletes are processed for the CMV. If no more pending deletes are found in step 59 then control goes to step 62 where a determination is made, in the event of an idle period, whether there are any pending deletes for the opposite side of the CMV (OCMV), in this case for the volume DEF. If there are pending deletes for the OCMV then in step 63 the robotic picker 5 will be instructed to turn the CMV over so that the OCMV is mounted. When the OCMV is mounted it becomes the CVM, thus the volume DEF is now the CMV. Step 63 then proceeds to perform a predetermined number of pending deletes on the volume DEF followed by removing the corresponding rows from the deleted objects table and updating the delete space and free space in the volume table 39.

When step 63 is completed control returns to the dispatcher and the steps 48–57 are repeated as necessary. When control returns to step 59, however, the volume DEF is no longer the OCMV but is the CMV so that if any pending deletes remain for the volume DEF they will be performed in steps 59 and 61. If upon the completion of deleting objects on the volume DEF more deletes request were made for the volume ABC, now the OCMV, then steps 62, and 63 will be again performed to delete those objects during idle periods when no other work is pending.

When there are no pending deletes to be performed for both the CMV and the OCMV then step 62 exits to step 64. In step 64 a determination is made, in the event of an idle period, whether there is a volume accessible to the internal optical disk drive 4 which has pending deletes. If such accessible volumes do exist, then step 65 identifies the library-resident volume having the greatest amount of logically deleted space by inspecting the volume table 39. This identified volume will be mounted thus becoming the new CMV. Once again a predetermined number of pending deletes will be performed followed by removal of the corresponding rows from the deleted objects table 38 and the delete space and free space of the volume table 39 will be updated. Any remaining pending deletes would be performed in steps 59 and 61 until all pending deletes for the CMV are performed. After all of the pending deletes are performed for the CMV the opposite side is again checked for pending deletes in step 62 and the process continues. When there is no other pending work and all pending deletes have been performed, then in step 67 the task 66 falls into a wait state.

Pending deletes for shelf-resident volumes are also performed during periods of inactivity but only for those volumes currently mounted on the external optical disk drive 10. An operator will not be prompted by the LCS 29 to flip a currently mounted volume or to mount a shelf-resident optical disk volume for the purpose of performing pending deletes. This avoids unnecessarily typing up the external optical disk drive 10 due to an operator not being immediately available to respond to the prompt.

Psuedo code for the task 66 is given below as an example of how to carry out the steps 48–65 of FIG. 7.

```
PSUEDO CODE:
    If there is old work to cleanup then
        cleanup old work.
    If there is new "real" work for this drive task to
    do then
        Do
            If the new work is a write or defrag then
                Do
                    If there are pending deletes for
                    the volume which is to be written
                    to or defragged then
                        Do.
                            Perform all pending
                            deletes
                            Remove all corresponding
                            rows from the deleted
                            objects table
                            Update the volume's
                            deleted space and free
                            space
                        End
                    Else there are no pending deletes
                    so perform the write or defrag
                End
            Else the new work is not a write or defrag so
            don't worry about pending deletes, just
            perform the new work
        End
    Else there is no new "real" work for this drive
    task to do so attempt to find some deletes for
    this drive task to execute
        Do
            If the deleted space for the currently
            mounted volume is not zero then there
            are deletes to be done so
                Do
                    Perform a certain number of
                    deletes for the currently
```

-continued
```
                mounted volume
                Remove all corresponding rows
                from the deleted objects table
                Update the volume's deleted
                space and free space
            End
        Else
            If the deleted space for the
            opposite side of the currently
            mounted volume is not zero then
            there are deletes to be done so
                Do
                    Mount the opposite side
                    of the currently mounted
                    volume
                    Perform a certain number
                    of deletes for the
                    currently mounted volume
                    Remove all corresponding
                    rows from the deleted
                    objects table
                    Update the volume's
                    deleted space and free
                    space
                End
            Else there are no deletes for
            either the mounted or opposite side
            of the mounted volume so
                If there are any volumes
                accessible to this drive,
                which have a nonzero deleted
                space amount then
                    Do
                        Choose the volume
                        which is accessible
                        to the drive task
                        seeking work, which
                        has the largest
                        amount of deleted
                        space
                        Mount the chosen
                        volume
                        Perform a certain
                        number of deletes
                        for the currently
                        mounted volume
                        Remove all
                        corresponding rows
                        from the deleted
                        objects table
                        Update the volume's
                        deleted space and
                        free space
                    End
                Else there are no deletes
                which this drive task can do
        End
```

Over time the optical disks in the automated optical disk library become full and some optical disks will eventually have to be ejected. LCS 29 will eject the least recently mounted optical disk for storage on the shelf 36 so that an optical disk having more free space may be loaded into the automated optical disk library 1. Based on the rate at which new objects are created and the size of the new objects, it is very likely that by the time all of the objects on a volume expire that that volume will be shelf-resident. Delete requests for objects residing on shelf-resident volumes are processed similarly to the delete requests for objects on library-resident volumes. Since only pending deletes for the shelf-resident volume currently mounted on the external optical disk drive 10 are serviced it is expected that the vast majority of pending deletes will be for shelf-resident volumes. These unprocessed pending deletes require a significant amount of space on the CDB 34 due to the rows used in the deleted objects table 38 to represent the pending deletes.

Figure 8:
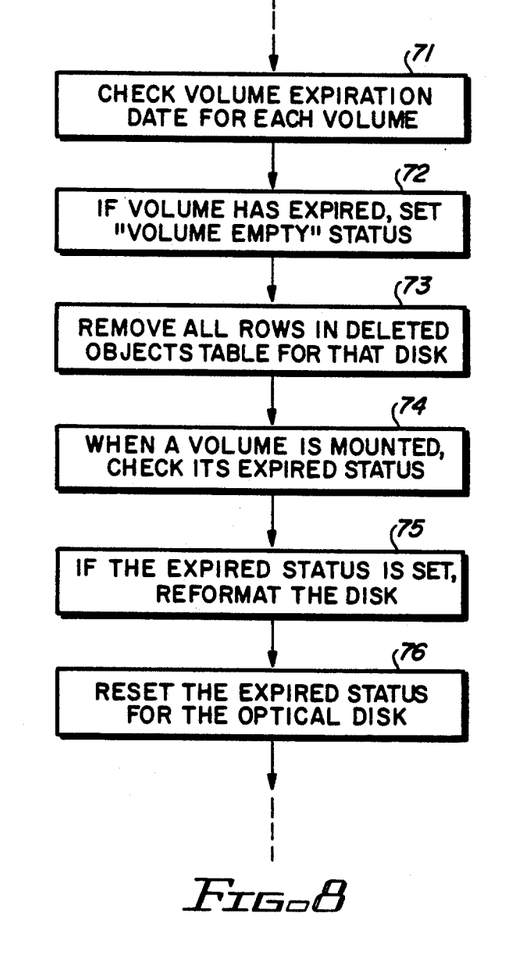
FIG. 8 is a flow diagram of a routine for reclaiming space on an optical disk in the present invention.

Referring now to FIG. 8, a routine for deleting all objects stored on an optical disk is shown. Each volume has an expiration date which is calculated as objects are written to that volume. The expiration date of a volume is the same date as the expiration date of the object stored on that volume having the latest expiration date. An expiration date for an optical disk is defined by the volume of that optical disk having the latest expiration date. In step 71 the expiration date is checked for each volume in the automated optical disk library 1 and in the shelf 36. The OSMC 28 performs the check at a predetermined time each day, for example, a time when low activity in the automated optical disk library 1 is expected. The OSMC 28 communicates to the LCS 29 which volumes have reached their expiration date in step 72 and the LCS 29 sets the "volume empty" status to "Y" for those empty volumes in the volume table 39. A volume is not considered empty unless all objects residing on both volumes of an optical disk have expired. If all of the objects on either volume of an optical disk have not expired, then neither volume will be considered empty and the "volume empty" field for those volumes will be set to "N".

All of the rows in the deleted objects table 38 for the pending deletes associated with a volume that has had its volume empty status set to "Y" are deleted in step 73 and the delete space and free space are updated. Since a volume is not considered empty unless both volumes thereon are empty, the pending deletes for both volumes will be deleted. A single SQL DELETE command can delete all of the rows for an empty volume; this is far more efficient than deleting the rows one at a time. Furthermore, space on the CDB 34 is made available sooner than if waiting until the empty volume was mounted during an idle period. When both volumes on an optical disk have reached their expiration date both volumes will have their volume empty status set to "Y" and the expired status for those volumes will be set.

Each time a volume is mounted its expired status is checked in step 74. If the expired status is set then the optical disk containing that volume is reformatted by issuing a FORMAT command to the system controller 17 in step 75. Reformatting the disk involves reformatting the mounted volume, flipping the disk, and reformatting the opposite side. Reformatting results in reclaiming all of the space on the optical disk by causing the file format control structures on the optical disk to be updated and all of the space thereon being made available for use. All objects on the optical disk are physically deleted so that the space is reclaimed for writing new objects. In step 76 the expired status is reset and the volume table 39 is updated to show the amount of free space, volume empty status, etc.

While the invention has been particularly described with reference to particular embodiments thereof, it will be understood by those skilled in the art that various other changes in detail may be made therein without departing from the spirit, scope, and teaching of the invention. For example, the preferred embodiment has been described using optical disks but the invention is equally applicable to other types of libraries such as DASD, floppy disk, tape, etc.

What is claimed is:

1. In an information processing system, a machine-executed method of deleting objects from a volume, said machine-executed method comprising the steps of:

receiving a delete request for deleting an object from a first volume;

writing the delete request to a deleted objects table such that the delete request is added to a list of pending deletes for the first volume;

logically deleting the space associated with the delete request;

receiving a write request for the first volume;

mounting the first volume on a drive if the first volume is not already mounted;

determining whether said volume has expired; and if all of the objects on said volume have expired;

deleting a list of pending deletes for said volume;

checking the expired status of an optical disk containing said volume when said volume is mounted; and deleting all of the objects on the disk by reformatting the disk if the expired status is set;

if all of the objects on the volume have not expired;

deleting all of the objects on the first volume that are listed in the list of pending deletes;

adding logically deleted space of the first volume to current free space of the first volume; and performing the write request.

2. The method according to claim 1 wherein delete request is user initiated.

3. In an information processing system, a machine-executed method of deleting objects from a volume, said machine-executed method comprising the steps of:

receiving defragmentation request for a first volume;

mounting the first volume on a drive if the first volume is not already mounted;

determining whether said volume has expired; and if all of the objects on said volume have expired;

setting a volume empty status for said volume;

deleting a list of pending deletes for said volume;

checking the expired status of an optical disk containing said volume when said volume is mounted; and deleting all of the objects on the disk by reformatting the disk if the expired status is set;

if all of the objects on said volume have not expired;

deleting all of the objects listed in a list of pending deletes for the first volume;

adding logically deleted space to current free space of the first volume; and defragmenting the first volume.

4. The method according to claim 3 further comprising the steps of:

deleting one or more objects from a currently mounted volume during library idle periods;

if there are no objects to be deleted from the currently mounted volume during library idle periods:

mounting an unmounted volume having the greatest amount of logically deleted space; and deleting objects in groups of one or more objects from said unmounted volume until all pending deletes have been performed.

5. A computer process for deleting objects from volumes in an automated storage library wherein the objects to be deleted are logically but not physically deleted until a predetermined event occurs, said automated storage library having a plurality of storage media wherein each storage medium has at least one volume for storing the objects thereon, the computer process comprising the steps of:

receiving a delete request for deleting an object from a first volume;

writing the delete request to a deleted objects table such that the delete request is added to alist of pending deletes for the first volume storing the object to be deleted, the space of the object being added to logically deleted space of the first volume;

receiving a write request for the first volume;

mounting the first volume if the first volume is not already mounted;

determining whether all of the objects stored on a storage medium have expired; and if all of the objects on the storage medium have expired:

setting an expired status of the storage medium;

deleting a list of pending deletes for the storage medium; and reformatting the storage medium when the storage medium is mounted;

if all of the objects on the storage medium have not expired:

deleting all objects on the first volume that are listed in the list of pending deletes for the first volume;

adding the logically deleted space to current free space of the first volume; and performing the write request.

6. The computer process according to claim 3 wherein the delete request is user initiated.

7. The computer process according to claim 3 further comprising the steps of:

receiving a defrag request for a second volume;

mounting the second volume on a drive if the second volume is currently unmounted;

deleting all objects from the second volume that are listed in a list of pending deletes for the second volume;

adding logically deleted space to current free space of the second volume; and defragmenting the second volume.

8. The method according to claim 5 further comprising the steps of:

deleting one or more pending deletes for a mounted volume;

if there are no pending deletes for the currently mounted volume:

mounting the opposite side of the currently mounted volume if the opposite side has pending deletes; and deleting a predetermined number of objects from the opposite side during an library idle period; and if there are no pending deletes for the opposite side;

mounting an unmounted volume having the greatest amount of logically deleted space during another idle period; and deleting a predetermined number of objects on the unmounted volume.

* * * * *